United States Patent [19]
Kubo et al.

[11] Patent Number: 5,317,221
[45] Date of Patent: May 31, 1994

[54] LINEAR DRIVING DEVICE

[75] Inventors: Tadayuki Kubo, Tsuchiura; Kazuo Watanabe, Ushiku; Michio Horikoshi, Moriyamachi, all of Japan

[73] Assignee: Canon Kabushiki Kaisha, Tokyo, Japan

[21] Appl. No.: 936,840

[22] Filed: Aug. 28, 1992

[30] Foreign Application Priority Data

| Sep. 4, 1991 | [JP] | Japan | 3-250318 |
| Sep. 4, 1991 | [JP] | Japan | 3-250321 |
| Jan. 31, 1992 | [JP] | Japan | 4-040613 |

[51] Int. Cl.$^5$ .............................................. H02K 41/00
[52] U.S. Cl. .............................................. 310/12; 310/14
[58] Field of Search .............................. 310/12, 14, 90

[56] References Cited

U.S. PATENT DOCUMENTS

| 4,988,903 | 1/1991 | Koriyama | 310/12 |
| 5,057,723 | 10/1991 | Umehara et al. | 310/12 |
| 5,128,569 | 1/1992 | Gladish | 310/12 |
| 5,142,172 | 8/1992 | Horikoshi et al. | 310/13 |
| 5,184,037 | 2/1993 | Kobayashi | 310/26 |

FOREIGN PATENT DOCUMENTS

| 59-72317 | 4/1984 | Japan . |
| 2-22082 | 2/1990 | Japan . |

*Primary Examiner*—Emanuel T. Voeltz
*Assistant Examiner*—Judson H. Jones
*Attorney, Agent, or Firm*—Fitzpatrick, Cella, Harper & Scinto

[57] ABSTRACT

A linear driving device includes a hydrostatic gas bearing, a shaft supported by the bearing, and a voice-coil motor for driving the shaft in a direction of movement. The bearing and the shaft are disposed within the voice-coil motor. The device further includes a locking mechanism for constraining the movement of the shaft in its direction of movement. In addition, the voice-coil motor includes a coil assembly having a coil. The coil assembly forms a closed space surrounded by the coil. The coil assembly has a plurality of exhaust holes therein communicating with the outside from the closed space.

13 Claims, 8 Drawing Sheets

LINEAR DRIVING DEVICE

BACKGROUND OF THE INVENTION

1. Field of the Invention

This invention relates to a linear driving device obtained by combining a hydrostatic gas bearing or a direct-acting bearing and a voice-coil motor.

2. Description of the Prior Art

FIG. 9 shows a linear driving device used in a conventional precision measuring apparatus or the like. A voice-coil motor, comprising a coil assembly 103a and a magnetic-circuit assembly 103, is disposed at the side of one end of a shaft 102 having a rectangular cross section supported by a hydrostatic gas bearing 101. A linear encoder 104 is mounted at the side of the other end of the shaft 102, and a measuring apparatus or the like is mounted at an end portion 102a of the shaft 102. The voice-coil motor moves the shaft 102 to a target position in accordance with a positional signal from the linear encoder 104.

On the other hand, in Japanese Utility Model Application Public Disclosure (Kokai) No. 59-72317 (1984), there is disclosed an approach such that in a shaft and a bearing having circular cross sections, in order to restrain the degree of freedom of the rotation of the shaft, an engaging unit for preventing rotation having a fluid outlet is provided between the shaft and the bearing.

In the configuration shown FIG. 9, however, since the voice-coil motor and the hydrostatic gas bearing are linearly arranged, the size of the device becomes large. Furthermore, in order to configure a hydrostatic gas bearing having a rectangular cross section, a large number of components are needed, and it is necessary to perform adjustment operations, such as gap adjustment and the like, in assembling the components, causing an increase in the production cost. In the configuration of the above-described publication, since the engaging unit for preventing rotation is provided between the shaft and the bearing, and the engaging unit and a unit engaged therewith form an air outflow channel provided in the inner wall of a long hole or the inner wall of the bearing, it is difficult, for example, to process these units with high precision and adjust gaps between them.

Furthermore, in the above-described conventional approaches, if an external force or the like is applied to the device when the supply of pressurized gas is stopped due to malfunctioning of the apparatus, human error, or the like, and the shaft contacts the bearing, the shaft moves when it is in a contact state with the bearing, causing damage to the shaft and the bearing.

Moreover, the gap between the coil and the yoke of the motor is the only portion of the device communicating with the outside (air) in the closed space surrounded by the coil of the voice-coil motor, and therefore the efficiency of exhaust is poor. Hence, the coil and the shaft tend to be displaced (in the order of 0.1 μm) in the axial direction (the direction of a positioning operation) due to a change in pressure accompanying a change in the volume of the closed space during a driving operation for positioning, causing vibration in the axial direction, and causing a deterioration in the accuracy of a positioning operation and lengthening the time period of the positioning operation.

SUMMARY OF THE INVENTION

It is an object of the present invention to overcome the deficiencies in the prior art.

It is still another object of the present invention to provide a linear driving device which prevents movement of a shaft and a hydrostatic bearing supporting the shaft caused by an external force when the bearing contacts the shaft due to the stopping of the supply of pressurized gas to the shaft.

It is another object of the present invention to provide a linear driving device having a small size.

It is still a further object of the present invention to provide a linear driving device having a small number of components which do not require complex adjustment operations during assembling.

It is another object of the present invention to provide a linear driving device in which it is easy to adjust the gaps between the components with a high precision.

It is still another object of the present invention to provide a linear driving device having an efficient exhaust system.

It is still another object of the present invention to provide a linear driving device which can highly accurately position a shaft thereof in a short period of time.

According to one aspect, the present invention which achieves one or more of these objectives, relates to a linear driving device comprising a hydrostatic gas bearing, a shaft supported by the bearing, the bearing and the shaft being disposed within a voice-coil motor, and the shaft moving in a direction of movement in response to actuation of the voice-coil motor, and a locking mechanism for constraining movement of the shaft in its direction of movement. The locking mechanism can comprise an air cylinder. In addition, a member can be fixed to the side of the shaft. In this embodiment, the air cylinder is fixed to the shaft and clamps the member fixed to the side of the shaft when the supply of a pressurized gas to the hydrostatic gas bearing is stopped. The device can also comprise a housing for holding the bearing. The housing can also function as a yoke of the voice-coil motor.

According to another aspect, the invention which achieves at least one of these objectives relates to a linear driving device comprising a voice-coil motor comprising a coil assembly comprising a coil, the coil assembly forming a closed space surrounded by the coil, and the coil assembly having a plurality of exhaust holes therein communicating with the outside from the closed space, a shaft driven by the voice-coil motor, and a direct-acting bearing supporting the shaft. The voice-coil motor and the direct-acting bearing position the shaft in a predetermined position. The direct-acting bearing can comprise a hydrostatic gas bearing.

The conductance $C_2$ of each of the plurality of exhaust holes satisfies the following equation and inequality:

$$C_2 = QL/ax,$$

and $$x < x_0,$$

where Q is the quantity of the flow of gas corresponding to a change in volume of the closed space per unit time, L is the length of the closed space in the axial direction, $\Delta x$ is the amount of the displacement of the coil and the shaft in the axial direction due to a force caused by a pressure change within the closed space due to the exhaust of the quantity of a flow of gas Q from the exhaust hole, and $x_0$ is the permissible value of a vibration in the axial direction.

The shape, the size, and the number of the exhaust holes are within a range such that a relationship $f > 2f_0$ holds between the natural frequency f of a system comprising the coil of the voice-coil motor, the direct-acting bearing, and the shaft supported by the direct-acting bearing, the the control frequency $f_0$. The direct-acting bearing and the shaft supported thereby are disposed within the voice-coil motor. The device can further comprise a bearing housing for housing the direct-acting bearing. The bearing housing can function as a yoke of a magnetic-circuit assembly of the voice-coil motor.

According to another aspect, the invention which achieves at least one of these objectives relates to an apparatus for use in a linear driving device having a voice-coil motor for driving a shaft supported by a hydrostatic bearing, both disposed within the voice-coil motor. The apparatus comprises a locking mechanism for constraining the movement of the shaft in its direction of movement. The locking mechanism can constrain the movement of the shaft in the axial direction thereof.

According to still another aspect, the present invention which achieves at least one of these objectives relates to a linear driving device comprising a hydrostatic gas bearing, a shaft supported by the hydrostatic gas bearing, a voice-coil motor for driving the shaft in a direction of movement, and a locking mechanism for constraining movement of the shaft in its direction of movement.

According to still another aspect, the present invention which achieves these objectives relates to an apparatus for use in a linear driving device having a voice-coil motor comprising a coil assembly forming a closed space surrounded by a coil, for driving a shaft that is supported by a direct-acting bearing to position the shaft in a predetermined position, the apparatus comprising a wall having one side facing the closed space and another side facing the outside of the linear driving device. The wall has a plurality of exhaust holes therein connecting the closed space, with the outside. The wall can comprise a part of the coil assembly. In addition, the coil assembly can comprise a coil head and a sleeve and coil. In this embodiment, the wall comprises the coil head.

These and other advantages, features, and objects of the present invention will become evident from the following detailed description of the preferred embodiments in conjunction with the accompanying drawings.

DESCRIPTION OF THE PREFERRED EMBODIMENTS

Figure 1:
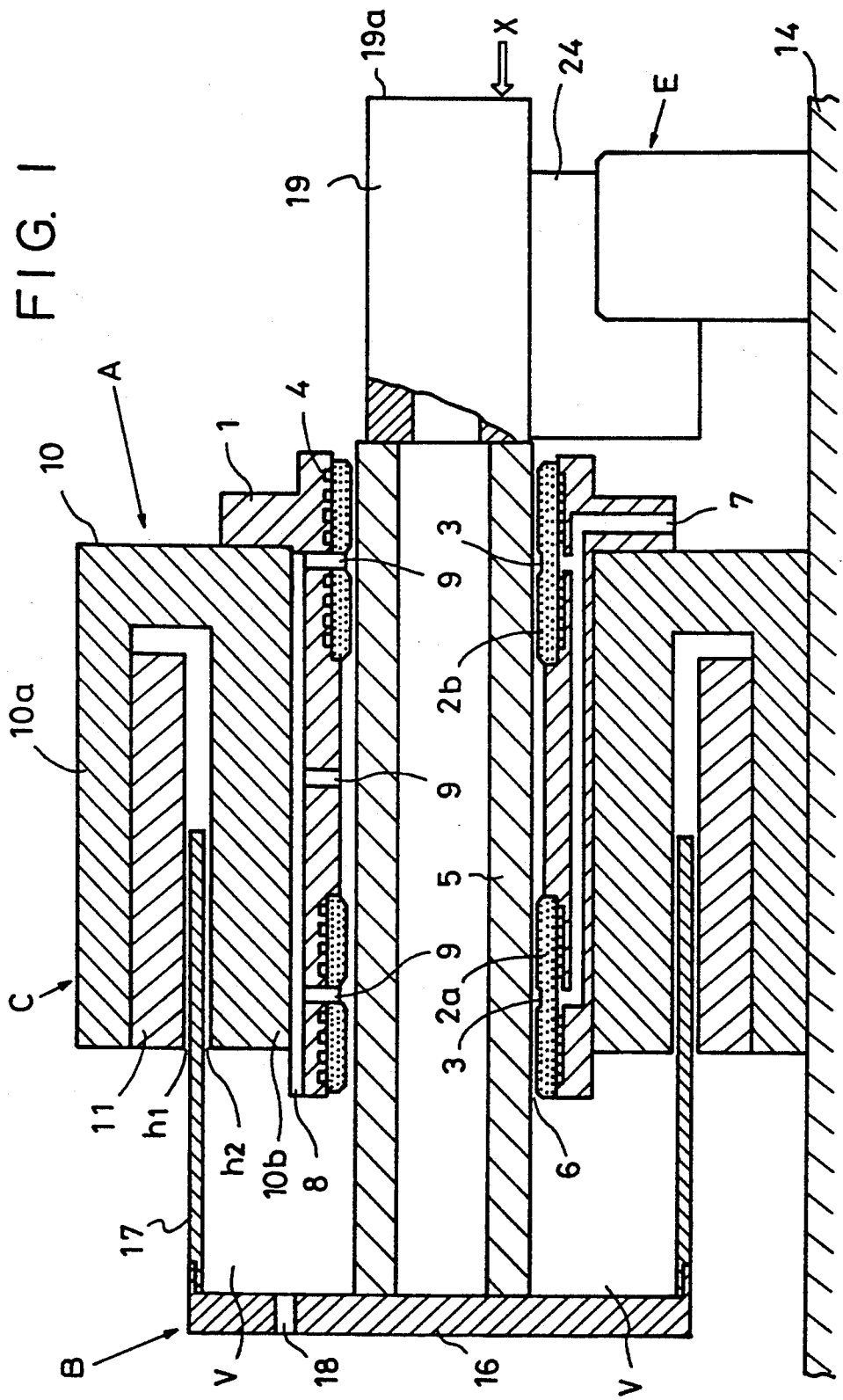
FIG. 1 is a partical cross-sectional view showing the configuration of a linear driving device according to an embodiment of the present invention.
Figure 2:
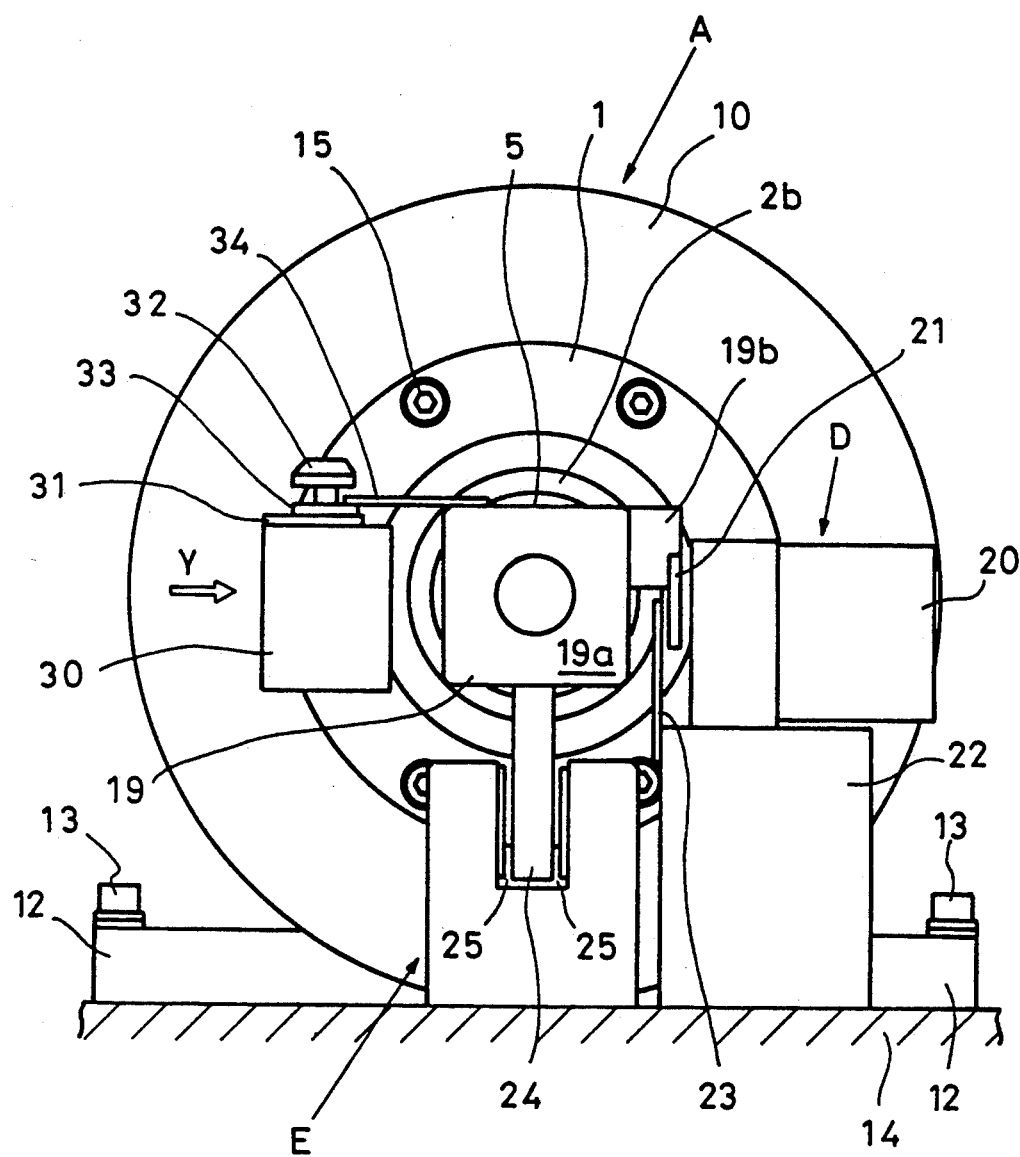
FIG. 2 is a diagram showing the configuration of the device, as seen from the arrow X shown in FIG. 1.

FIG. 1 is a partial cross-sectional view showing the configuration of a device according to an embodiment of the present invention. FIG. 2 is a diagram showing the configuration of the device, as seen from the direction X shown in FIG. 1. In FIG. 1, there is shown a cylindrical bearing housing 1. Annular porous bearing members 2a and 2b are fitted in the bearing housing 1 by means of a shrinkage fit or the like. Each of the bearing members 2a and 2b is provided with an exhaust groove 3 in the circumferential direction thereof. A plurality of air-supplying grooves 4 are provided in the circumferential direction of the bearing housing 1. There are also shown a shaft 5 and a small gap 6. An air-supplying hole 7 is provided in the bearing housing 1, which communicates with the air-supplying grooves 4, as shown in FIG. 1. An exhaust groove 8 is provided at the outer circumferential surface of the bearing housing 1, with which exhaust holes communicate. A magnetic-circuit assembly A of a voice-coil motor C comprises a yoke member 10 and a magnet 11. The yoke member 10 comprises an outer yoke member 10a and an inner yoke member 10b. The magnetic-circuit assembly A is, for example, provided with a mounting member 12, which is fixed to a base 14 by a bolt 13 or the like. The bearing housing 1 is fitted in the inner-diameter portion of the magnetic-circuit assembly A, and is fixed by bolts 15. A coil assembly B of the voice-coil motor C comprises a coil head 16, a sleeve and a coil 17. The voicecoil motor C comprises the magnetic-circuit assembly A and the coil assembly B. At least one exhaust hole 18 is provided in the coil head 16. The coil head 16 is fixed to one end of the shaft 5. A head member 19 is mounted to the other end of the shaft 5. Reference numeral 19a represents a mounting surface for a measuring device (not shown) or the like. A linear encoder D comprises a detection head 20 and a scale 21. The detection head 20 is fixed to the base 14 by a mounting member 22. The scale 21 is fixed to a scale mounting portion 19b of the head member 19 by a leaf spring (not shown) or the like. There is also shown a light-shielding member 23.

Figure 3:
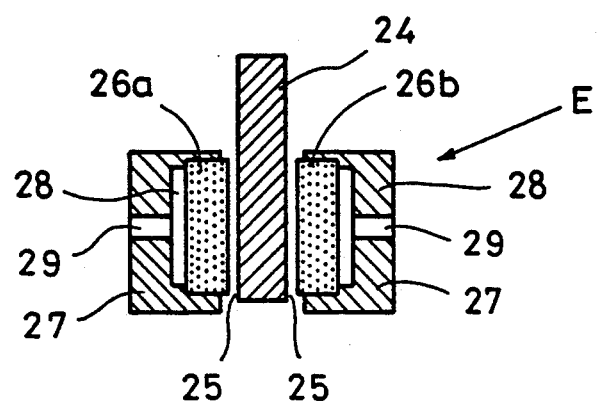
FIG. 3 is a cross-sectional view of a rotation-stop unit of the embodiment.

There is also shown a rotation-stop unit E, a partial cross-sectional view of which is shown in FIG. 3. The rotation-stop unit E comprises a guide plate 24 fixed to the head member 19, and holding members 27 for holding flat porous bearing members 26a and 26b, disposed at both sides of the guide plate 24, a predetermined distance from guide plate 24, via predetermined small gaps 25. A pocket 28 and an air-supplying hole 29 are provided in each of the holding members 27. The unit E can prevent rotation of the shaft 5 when pressurized gas is supplied to holes 29 as will be discussed below.

Figure 4:
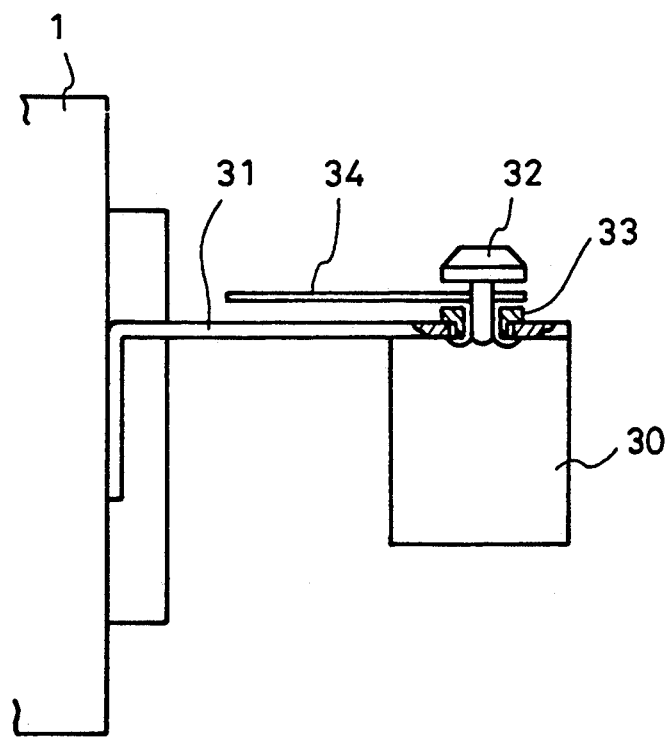
FIG. 4 is a diagram showing the configuration of the device, as seen from the arrow Y shown in FIG. 2.

FIG. 4 is a diagram showing the configuration of the device, as seen from the arrow Y shown in FIG. 2, and illustrates a portion for mounting an air cylinder 30. The air cylinder 30 (for example, of a single-pushing type) is fixed to the bearing housing 1 by a bracket 31. A clamp head 32 is provided on the rod of the air cylinder 30. There is also shown a clamp mount 33. A leaf spring 34 is fixed to the head member 19, and is disposed between the clamp head 32 and the clamp mount 33 with a predetermined gap, as shown in FIG. 4.

In the above-described configuration, if a pressurized gas is supplied from the air-supplying hole 7 of the bearing housing 1, the gas passes through the annular porous bearing members 2a and 2b, and is ejected into the small gap 6 to hydrostatically support the shaft 5 so that the shaft 5 is movable in the axial direction. The pressurized gas ejected into the small gap 6 is directly exhausted from the end portion of the bearing at the side of the head member 19 to the outside. The gas is also exhausted from the bearing housing 1 into a closed space V surrounded by the coil assembly B after passing through the other end portion of the bearing, the exhaust hole 9 and the exhaust groove 8, and is further exhausted from gaps $h_1$ and $h_2$ between the yoke member 10a, the magnet 11 and the sleeve 17, and the exhaust hole 18 to the outside of the device.

If the pressurized gas is supplied from the air-supplying holes 29 of the holding members 27 in the rotation-stop unit E, the gas passes through the flat porous bearing members 26a and 26b, and is ejected into the small gaps 25 to hydrostatically support the guide plate 24 and restrain the rotation of the shaft 5. The pressurized gas ejected into the small gaps 25 is exhausted from the end portion of the bearing to the outside. The voice-coil motor C moves the shaft 5 to a predetermined position in accordance with a positional signal from the linear encoder D. Usually (when the pressurized gas is supplied and the device is in an operating state), the air cylinder 30 causes the clamp head 32 to protrude to the position shown in FIGS. 2 and 4. However, if the pressurized gas is not supplied due to a malfunction in the device or human error, the clamp head 32 is retracted by clamp the leaf spring 34, whereby the movement of the shaft 5 in the axial direction is restrained.

Next, an explanation will be provided of the diameter d of the exhaust hole 18. If the number of the exhaust holes 18 is represented by n, the conductance $C_2$ of the exhaust holes 18 is expressed by the following expression (1):

$$C_2 = \Sigma C_{2,i} \tag{1}$$

If the conductance of the gaps $h_1$ and $h_2$ between the yoke member 10a, the magnet 11 and the sleeve 17 is represented by $C_1$, the total conductance $C_0$ is expressed by $C_0 = C_1 + C_2$.

The gas is exhausted from the bearing housing 1 into the closed space V. When the coil assembly B and the shaft 5 stop (for example, when a positioning operation has been completed), the pressure in the closed space V and the pressure of the outside (air) are in balance, and therefore no disturbance for a positioning operation in the axial direction is present.

In order to exhaust the quantity of flow of gas Q, corresponding to a change $\Delta V$ in the volume of the closed space V per unit time when the shaft 5 is moved by the voice-coil motor C, from the gaps $h_1$ and $h_2$ and the exhaust holes 18 at the moment when the coil assembly B moves, the pressure in the closed space V must change by an amount $\Delta P$ expressed by $\Delta P = P_a \cdot Q/C_0$, where $P_a$ represents the atmospheric pressure. Due to a force produced by the pressure change $\Delta P$, the coil assembly B tends to be moved in the axial direction by an amount $\Delta x$ expressed by $\Delta x = \Delta P \cdot L/P_a$, where L represents the length of the closed space V in the axial direction. This causes vibration in the axial direction. Accordingly, if the permissible value in design for vibration in the axial direction is represented by $x_0$, it is necessary to provide the gaps $h_1$ and $h_2$ and the exhaust holes 18 so that $\Delta x < x_0$ in the equation $C_0 = QL/\Delta x$ is obtained and so that such a conductance $C_0$ is obtained. In general, since the gaps $h_1$ and $h_2$ between the yoke member 10a, the magnet 11 and the sleeve 17 of the voice-coil motor C are more or less limited by thrust or the like, in order to obtain the necessary conductance $C_0$, the diameter d of the exhaust hole 18 must be determined in accordance with design conditions. When a single exhaust hole 18 is present or when a plurality (n) of exhaust holes 18 having the same shape are present, the diameter of the exhaust hole 18 is expressed by the following expression (2):

$$d > 2(8 \cdot \eta \cdot l \cdot C_2/\pi \cdot p_m \cdot n)^{\frac{1}{4}} \tag{2},$$

where $\eta$ represents the coefficient of viscosity of the gas, l represents the length of the exhaust hole 18 ($\approx$ the thickness of the coil head 16), $p_m$ represents the average of the pressures within and outside the coil assembly B, and n represents the number (n=1, 2, 3, . . . ) of the exhaust holes 18.

In general, it is important to provide a high control system gain of a servo control system in a positioning device in order to improve the servo performance, i.e., to improve accuracy in the positioning operation, to improve the speed of the positioning operation, to improve the stability of the control system against disturbance, and the like. For that purpose, in a typical design technique, the natural frequency f of a mechanical system is set to at least three times the control frequency $f_0$. However, the system may be controlled even by setting the natural frequency to about twice the control frequency for certain frequency characteristics (attenuation characteristics) of the mechanical system of the device. Accordingly, also in the linear driving device of the present invention, frequency characteristics so as to provide a natural frequency having a value of at least two to three times the control frequency are required for the mechanical system. When providing the exhaust holes 18 in the closed space V surrounded by the coil assembly B (the VCM (voice-coil motor) coil), since the natural frequency (the stiffness of the feeding system) of the system, comprising the coil assembly B, the direct-acting bearing comprising the bearing housing 1, the porous bearing members 2a and 2b, and the like, and the shaft 5 supported thereby, is expressed by a function f(m, c, k) of the mass m of the moving body, the coefficient of attenuation c, and the stiffness k, the shape, the size and the number of the exhaust holes 18 must be determined within a range to satisfy the relationship $f(m, c, k) \geq 2f_0$, where $f_0$ represents the control frequency. The values m, c and k change in accordance with the shape, the size and the number of the exhaust holes 18. That is, since the values m, c and k can be considered to be a function of the shape, the size, and the number of the exhaust holes 18, the upper limit values for the shape, the size and the number of the exhaust holes 18 are limited by the value of the natural frequency f(m, c, k).

Figure 5A:
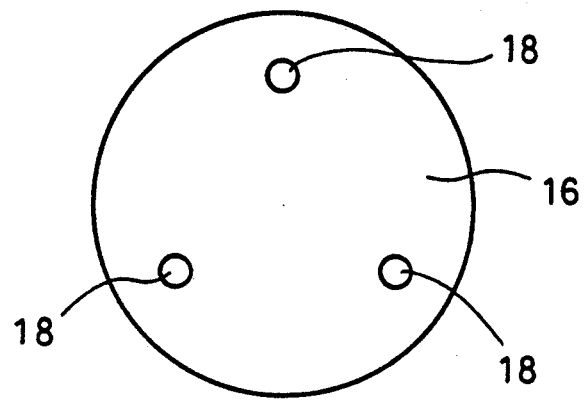
FIGS. 5(a)–5(c) are diagrams illustrating the arrangement of exhaust holes in the device shown in FIG. 1.
Figure 5B:
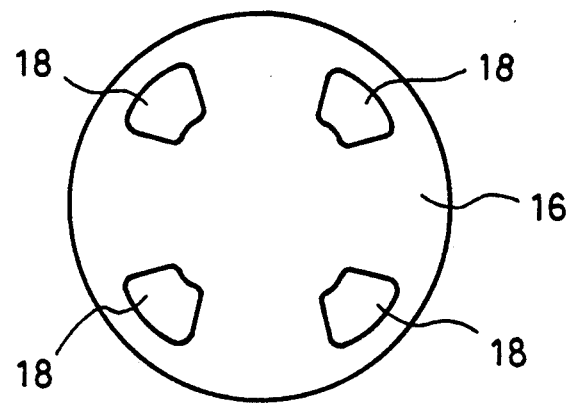
Figure 5C:
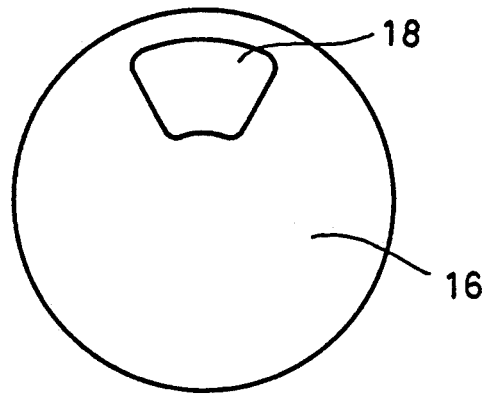

The voice-coil motor is designed to be a motor suitable for directly driving a member to be driven, and is designed so as to be adjusted to the position of the center of gravity of the member to be driven. The coil of the voice-coil motor is mounted on the member to be driven so as to become part of the member to be driven. Accordingly, if the weight of the coil is greatly unbalanced, the position of the center of gravity of the combined member to be driven is at a position deviated relative to the thrust applied to the coil. Hence, when providing the exhaust holes 18, for example, in the coil head 16, it is desirable to provide the exhaust holes 18 at positions where a weight balance can be obtained, as shown in FIGS. 5(a) and 5(b). When an uneven load is inevitably provided in the designing stage, it is desirable to arrange the exhaust hole so that a portion lower than the driving axis becomes heavier in the direction of the gravitational force, as shown in FIG. 5(c).

According to the present embodiment, 1) since the shaft and the gas bearing are disposed within the voice-coil motor C, the bearing of the driving system does not hang over the device, and therefore the moment load is minimized. Hence, it becomes possible to perform a highly precise operation for positioning the shaft in the axial direction, and to provide a small device.

2) Since the linear encoder D is disposed close to the mounting surface 19a for mounting the measuring device or the like, the device becomes less influenced by the deformation of the shaft due to a change in temperature, and it becomes possible to perform a highly precise feeding operation.

3) By disposing the rotation-stop unit outside the bearing housing 1, and configuring the unit with a flat hydrostatic bearing and a flat guide, production and assembling/adjusting operations are simplified, and it becomes possible to restrain the rotation of the shaft without diminishing the accuracy in positioning the shaft in the axial direction and in the attitude of the shaft.

4) By providing a locking mechanism which utilizes the air cylinder 30, the shaft can be fixed even if the supply of pressurized gas is stopped due to a malfunction of the device or human error, and the shaft contacts the bearing. Hence, it becomes possible to prevent damage on the surfaces of the bearing and the shaft.

5) Since the shaft and the bearing have circular cross sections, the number of components is reduced. Furthermore, since the gap can be controlled by the accuracy with which the components are manufactured, assembling and adjusting operations become unnecessary, and therefore an inexpensive device can be provided.

6) By providing the exhaust holes 18, the efficiency of exhaust is increased in the closed space V surrounded by the coil, and the displacement of the coil and the shaft in the axial direction due to a change in pressure accompanying a change in the volume of the closed space V in a driving operation for positioning is reduced. Hence, it is possible to minimize vibration in the axial direction, and to increase accuracy of a positioning operation and to reduce the time for the positioning operation.

7) Since in providing the exhaust holes 18, the shape, the size and the number of the exhaust holes 18 are determined so that the relationship between the natural frequency f of the mechanical system and the control frequency $f_0$ becomes $f \geq 2f_0$, the mechanical system can follow a control instruction to a sufficient degree without reducing its stiffness in feeding. As a result, it is possible to perform a high-precision and high-speed positioning operation.

Figure 6:
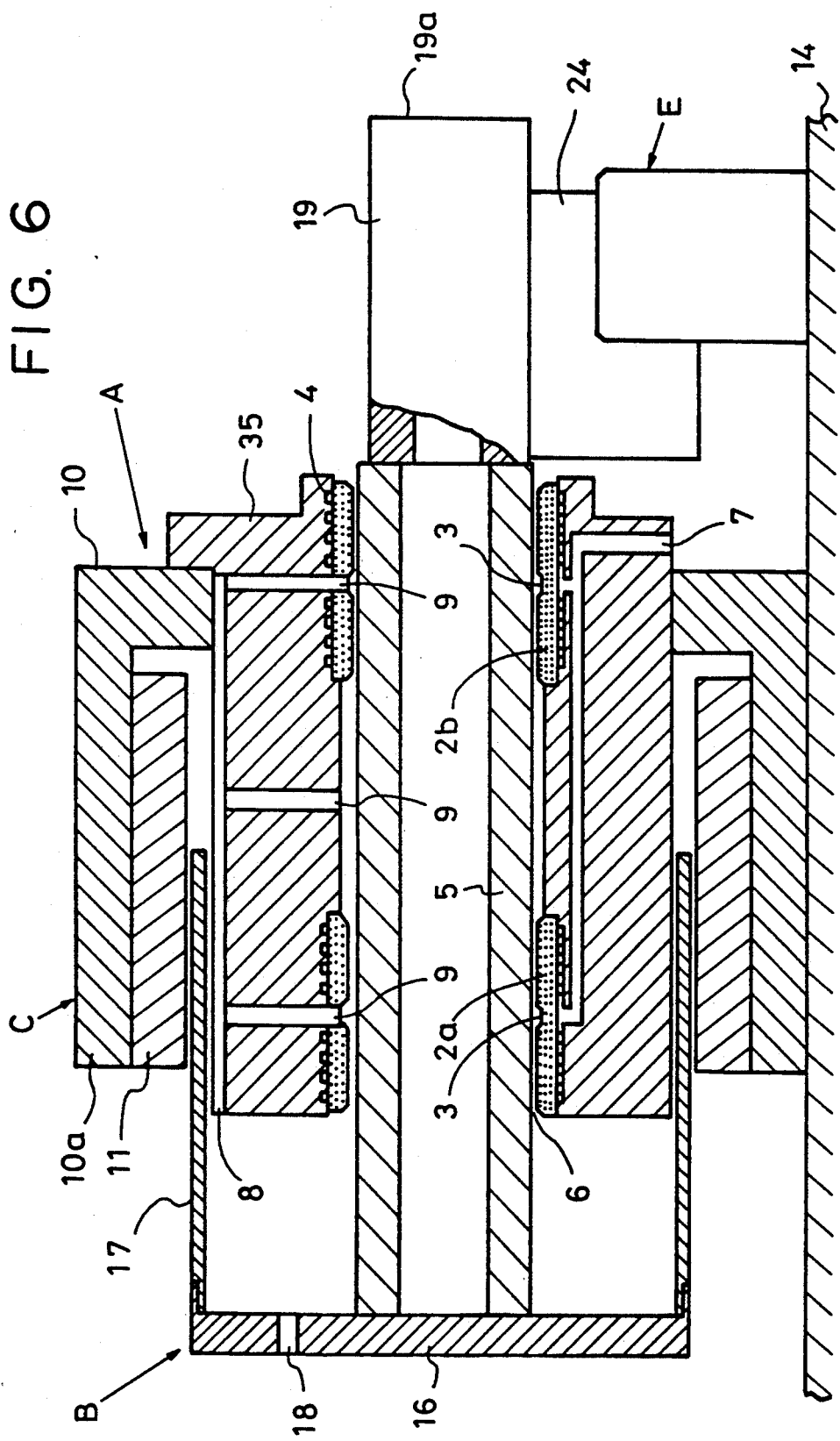
FIG. 6 is a partial cross-sectional view showing the configuration of a linear driving device according to another embodiment of the present invention.

FIG. 6 is a diagram showing the configuration of a device according to another embodiment of the present invention. In FIG. 6, the same components as those shown in FIGS. 1–5 are denoted by the same reference numerals, and an explanation of the same components as those shown in FIG. 1 will be omitted.

A bearing housing 35 made of a magnetic material also functions as the inner yoke 10b of the magnetic-circuit assembly A of the voice-coil motor C shown in FIG. 1 According to such a configuration, since the bearing housing constitutes a part of the magnetic-circuit assembly, the size of the device can be further reduced.

Although in the foregoing explanation, the gas bearing comprises a porous throttle having the porous bearing members 2a, 2b, 26a and 26b, any other type of throttle, such as an autogenous throttle, a surface throttle, an orifice throttle or the like, may be used. The locking mechanism is not limited to the air-cylinder type, but any other type may also be used.

Figure 7:
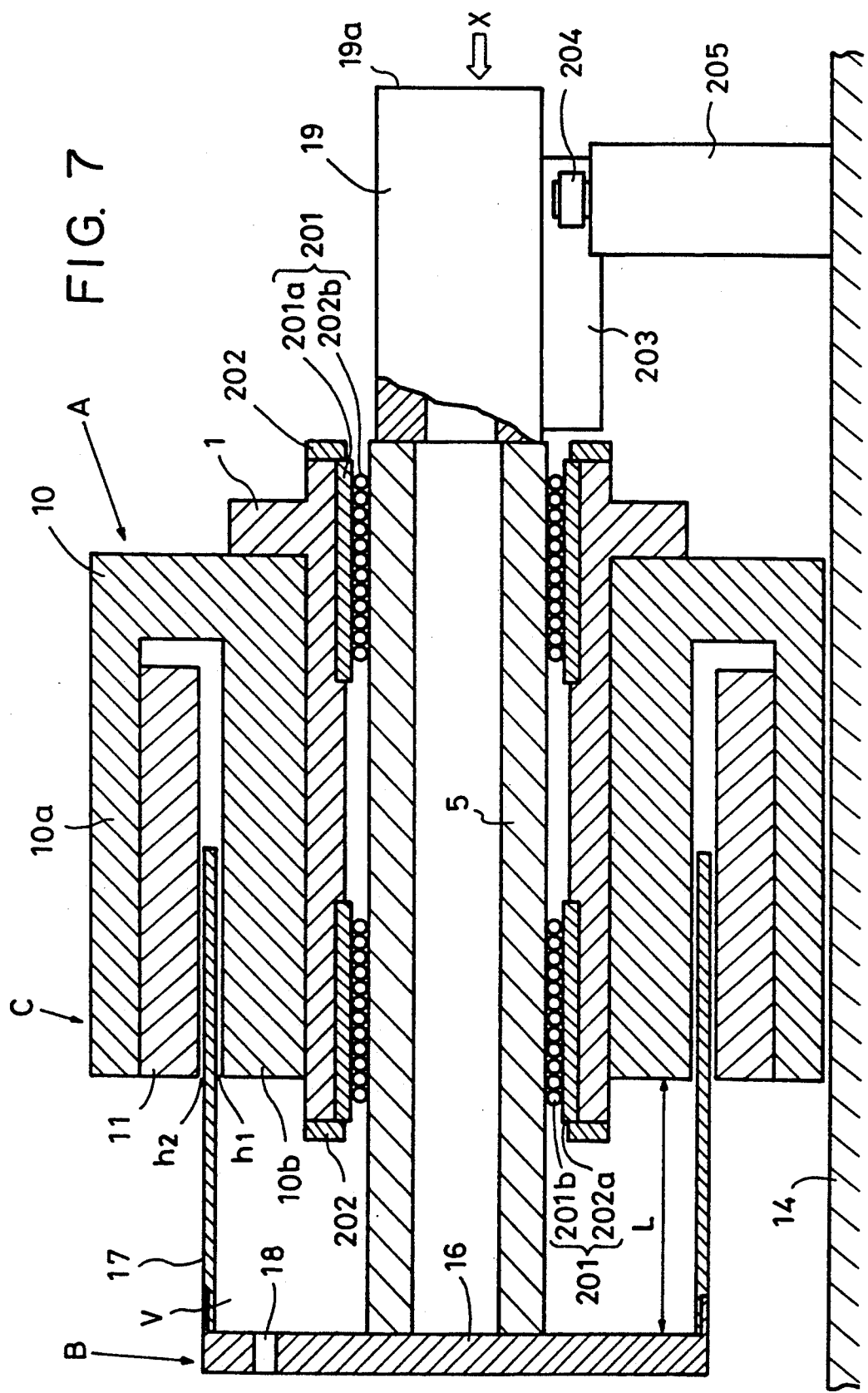
FIG. 7 is a partial cross-sectional view showing the configuration of a linear driving device according to still another embodiment of the present invention.
Figure 8:
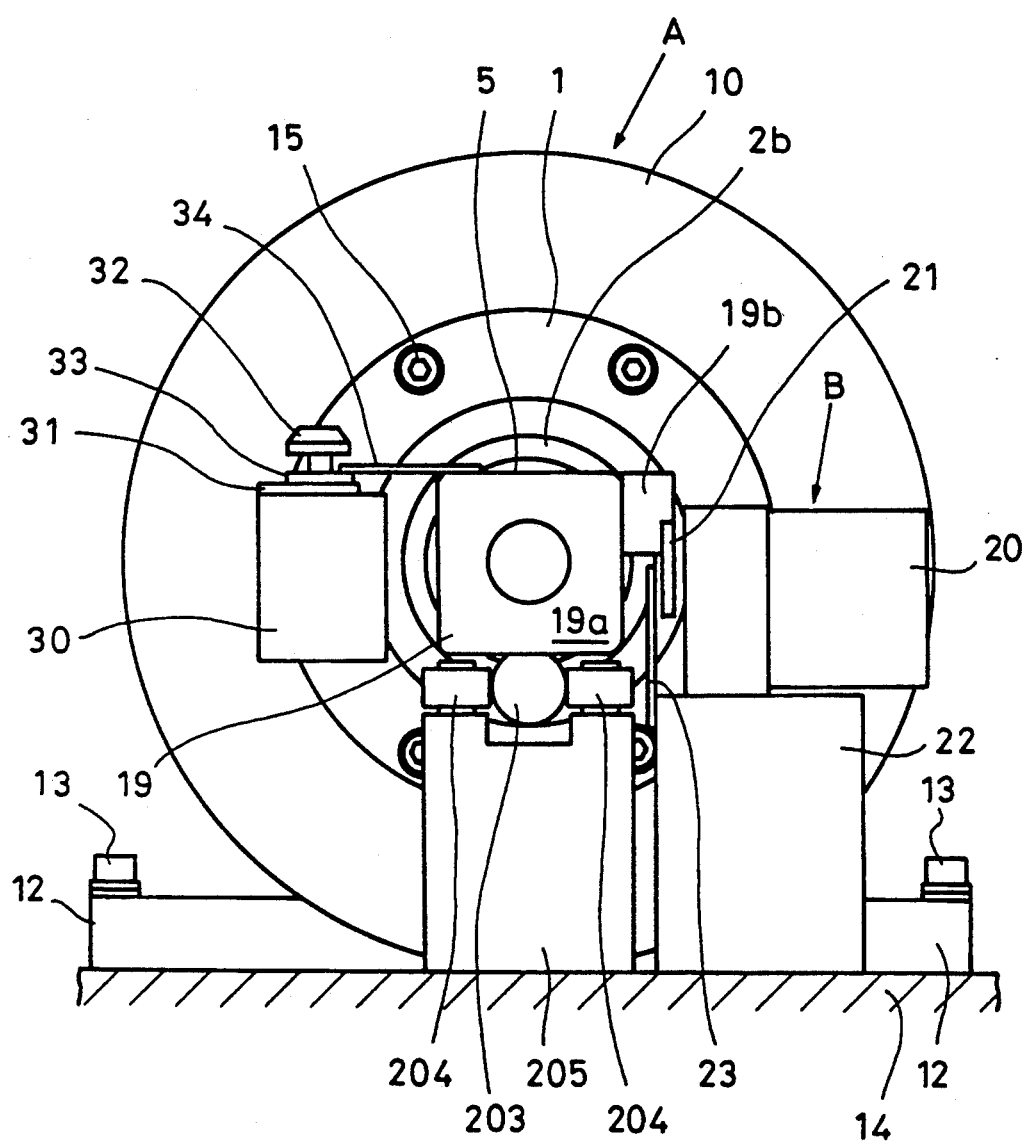
FIG. 8 is a diagram showing the configuration of the device, as seen from the direction X shown in FIG. 7.
Figure 9:
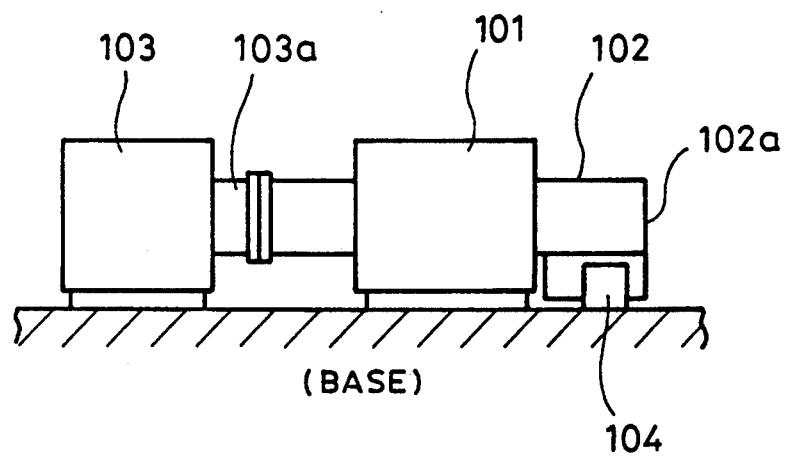
FIG. 9 is a diagram illustrating a conventional technique.

FIG. 7 is a partial cross-sectional view showing the configuration of a device according to a still another embodiment of the present invention. FIG. 8 is a diagram showing the configuration of the device, as seen from the arrow X shown in FIG. 7. In FIGS. 7 and 8, the same components as those shown in FIGS. 1 and 2 are denoted by the same reference numerals, and an explanation of the same components as those shown in FIGS. 1 and 2 will be omitted. A linear ball bearing 201, serving as a direct-acting bearing, comprises an outer cylinder 201a, steel balls 201b, a holder (not shown) and the like. The bearing 201 is fitted in the bearing housing 1 with an appropriate gap or an appropriate amount of pre-load, and is fixed by a pressing plate 202. A guide bar 203 is fixed to the head member 19. A bearing 204 comprises, for example, a ball bearing, a cam follower or the like, and is rotatably fixed to a bearing stand 205 fixed to the base 14. The position of the bearing 204 is adjusted so as to provide an appropriate amount of pre-load to the guide bar 203.

In the above-described configuration, the shaft 5 and the head member 19 are linearly driven by the voice-coil motor C in accordance with a positional signal from the linear encoder D while its degree of freedom in the direction of rotation is restrained by the guide bar 203 and the bearing 204.

In the above-described configuration, since the direc-tacting bearing comprises a linear ball bearing, the gas is not exhausted into the closed space V unlike the case of the hydrostatic gas bearing. However, the pressure in the closed space C and the pressure of the outside (air) are in balance in a state in which the coil assembly B and the shaft 5 stop (when the positioning operation has been completed). If a driving operation for positioning is performed in this state, a change $\Delta P$ in pressure is produced in order to exdriving source.

The direct-acting bearing is not limited to a ball bearing or a hydrostatic gas bearing, but a sliding bearing, a hydrostatic oil bearing, a magnetic bearing or the like may also be used.

As described above, according to the present invention, by disposing a hydrostatic gas bearing and a shaft having a circular cross section supported by the hydrostatic gas bearing within the a magnetic-circuit assembly of a voice-coil motor, and locking the movable member (the shaft), 1) the size of the entire device can be reduced.
2) Even if an external force or the like is applied to the device when the supply of the pressurized gas is stopped due to a malfunction of the device or a human error, and the shaft contacts the bearing, the shaft is not moved in the contact state, and it is therefore possible to prevent a damage in the shaft and the bearing.

By providing exhaust holes communicating with the outside from a closed space surrounded by the coil of a voice-coil motor, and by providing the exhaust holes with a predetermined conductance, it is possible to increase the efficiency of exhaust from the closed space, to reduce the displacement of the coil and the shaft in the axial direction due to a change in pressure accompanying a change in the volume of the closed space in a driving operation for haust the quantity of flow of gas Q corresponding to a change $\Delta V$ of the volume of the closed space V from the gaps $h_1$ and $h_2$ and the exhaust holes 18 having the conductance $C_0$. Accordingly, by obtaining the value of the conductance $C_2$ of the exhaust holes 18 so that the relationship between the displacement $\Delta x$ in the axial direction due to the pressure change $\Delta P$, and the permissible value $x_0$ becomes $\Delta x < x_0$, and by determining the diameter of the exhaust holes 18, it is possible to suppress vibration in the axial direction and improve accuracy in a positioning operation and to reduce the time for the positioning operation, in the same manner as explained in the embodiment shown in FIG. 1.

Although in the foregoing explanation, the exhaust hole 18 is assumed to have a circular shape, any other shape may be used, provided that the desired conductance $C_2$ is obtained. Although in the above-described embodiments, the shaft is assumed to have a circular cross section for the purpose of providing a small and inexpensive device, the shaft may have a polygonal cross section in order to obtain the effect of the present invention realized by providing the exhaust holes. The linear driving device to which the present invention is applied is not limited to a uniaxial type device, but a device of a biaxial type may also be used. That is, the present invention may be applied to any linear driving device which uses a voice-coil motor as a positioning, to suppress vibration in the axial direction, and to improve accuracy in a positioning operation and to reduce the time for the positioning operation. By providing the upper limit values of the shape, the size, and the number of the exhaust holes so that the relationship between the natural frequency f of the mechanical system and the control frequency $f_0$ becomes $f \geq 2f_0$, it is possible to improve accuracy in a positioning operation and to reduce the time for the positioning operation without reducing the stiffness in feeding of the mechanical system.

The individual components shown in FIGS. 1-4 and 6-8 are well known in the linear driving device art, the hydrostatic gas bearing art and the voice-coil motor art and their specific construction and operation is not critical to the invention or to the best mode for carrying out the invention.

What is claimed is:

1. A linear driving device comprising:
   a hydrostatic gas bearing;
   a shaft supported by said bearing, wherein said bearing and said shaft are both disposed within a voice-coil motor, wherein said shaft moves in a direction of movement in response to actuation of the voice-coil motor; and
   a locking mechanism for constraining the movement of said shaft in its direction of movement, wherein said locking mechanism comprises an air cylinder, and
   wherein a member is fixed to the side of said shaft, and wherein said air cylinder is fixed to said shaft and clamps the member fixed to the side of said shaft when the supply of a pressurized gas to said hydrostatic gas bearing is stopped.

2. A device according to claim 1, further comprising a housing for holding said bearing, wherein said housing also functions as a yoke of the voice-coil motor.

3. A linear driving device comprising:
   a voice-coil motor comprising a coil assembly comprising a coil, wherein said coil assembly forms a closed space surrounded by said coil, wherein said coil assembly has a plurality of exhaust holes therein communicating with the outside from the closed space;
   a shaft driven by said voice-coil motor; and
   a direct-acting bearing supporting said shaft, wherein said voice-coil motor and said direct-acting bearing position said shaft in a predetermined position, wherein the conductance, $C_2$, of each of the plurality of exhaust holes satisfies the following equation and inequality:

$$C_2 = QL/\Delta x$$

and $$\Delta x < x_0,$$

where Q is the quantity of flow of gas corresponding to a change in volume of the closed space per unit time, L is the length of the closed space in the axial direction, $\Delta x$ is the amount of displacement of said coil and said shaft in the axial direction due to a force caused by a pressure change within the closed space due to the exhaust of the quantity of flow of gas Q from the exhaust hole, and $x_0$ is the permissible value of vibration in the axial direction.

4. A linear driving device according to claim 3, wherein said direct-acting bearing comprises a hydrostatic gas bearing.

5. A linear driving comprising:
   a voice-coil motor comprising a coil assembly comprising a coil, wherein said coil assembly forms a closed space surrounded by said coil, wherein said coil assembly has a plurality of exhaust holes therein communicating with the outside from the closed space;
   a shaft driven by said voice-coil motor; and
   a direct-acting bearing supporting said shaft, wherein said voice-coil motor and said direct-acting bearing position said shaft in a predetermined position,
   wherein the shape, the size, and the number of said exhaust holes are within a range so that a relationship of $f > 2f_0$ holds between the natural frequency f of a system comprising said coil of said voice-coil motor, said direct-acting bearing, and said shaft supported by said direct-acting bearing, and the control frequency $f_0$.

6. A linear driving device according to claim 3, wherein said direct-acting bearing and said shaft supported thereby are disposed within said voice-coil motor.

7. A linear driving device according to claim 3, further comprising a bearing housing for housing said direct-acting bearing, wherein said bearing housing also functions as a yoke of a magnetic-circuit assembly of said voice-coil motor.

8. An apparatus for use in a linear driving device having a voice-coil motor for driving a shaft supported by a hydrostatic bearing, both disposed within the voice-coil motor, said apparatus comprising:
a locking mechanism for constraining the movement of the shaft in its direction of movement, wherein said locking mechanism comprises an air cylinder, wherein a member is fixed to the side of the shaft, and wherein said air cylinder is fixed to the shaft and clamps the member fixed to the side of the shaft when the supply of a pressurized gas to the hydrostatic gas bearing is stopped.

9. The apparatus according to claim 8, further comprising a housing for holding the bearing, wherein said housing also functions as a yoke of the voice-coil motor.

10. A linear driving device comprising:
a hydrostatic gas bearing;
a shaft supported by said hydrostatic bearing;
a voice-coil motor for driving said shaft in a direction of movement; and
a locking mechanism for constraining movement of said shaft in its direction of movement, wherein said locking mechanism comprises an air cylinder, wherein a member is fixed to the side of said shaft, and wherein said air cylinder is fixed to said shaft and clamps the member fixed to the side of said shaft when the supply of a pressurized gas to said hydrostatic gas bearing is stopped.

11. A device according to claim 10, further comprising a housing for holding said bearing, wherein said housing also functions as a yoke of said voice-coil motor.

12. An apparatus for use in a linear driving device having a voice-coil motor, including a coil assembly forming a closed space surrounded by a coil, for driving a shaft supported by a direct-acting bearing to position the shaft in a predetermined position, said apparatus comprising:
a wall having one side facing the closed space and another side facing the outside of the linear driving device, wherein said wall has a plurality of exhaust holes therein connecting the closed space with the outside, wherein the conductance, $C_2$, of each of the plurality of exhaust holes satisfies the following equation and inequality:
$$C_2 = QL/\Delta x$$

and $$\Delta x < x_0,$$

where Q is the quantity of flow of gas corresponding to a change in volume of the closed space per unit time, L is the length of the closed space in the axial direction, $\Delta x$ is the amount of displacement of said coil and said shaft in the axial direction due to a force caused by a pressure change within the closed space due to the exhaust of the quantity of flow of gas Q from the exhaust hole, and $x_0$ is the permissible value of vibration in the axial direction.

13. An apparatus for use in a linear driving device having a voice-coil motor, including a coil assembly forming a closed space surrounded by a coil, for driving a shaft supported by a direct-acting bearing to position the shaft in a predetermined position, said apparatus comprising:
a wall having one side facing the closed space and another side facing the outside of the linear driving device, wherein said wall has a plurality of exhaust holes therein connecting the closed space with the outside, wherein the shape, the size, and the number of said exhaust holes are within a range so that a relationship of $f > 2f_0$ holds between the natural frequency f of a system comprising the coil of the voice-coil motor, the direct-acting bearing, and the shaft supported by the direct-acting bearing, and the control frequency $f_0$.

* * * * *

UNITED STATES PATENT AND TRADEMARK OFFICE
CERTIFICATE OF CORRECTION

PATENT NO. : 5,317,221
DATED : May 31, 1994
INVENTOR(S) : TADAYUKI KUBO, ET AL.

It is certified that error appears in the above-indentified patent and that said Letters Patent is hereby corrected as shown below:

ON THE COVER PAGE

[56] REFERENCES CITED

U.S. PATENT DOCUMENTS

"5,128,569 1/1992 Gladish" should read
--5,128,569 7/1992 Gladish--.

COLUMN 2

Line 59, "$C_2 = QL/\alpha x$," should read --$C_2 = QL/\Delta x$--.
Line 68, "$\Delta x$" should read --x--.

COLUMN 3

Line 12, "the" (first occurrence) should read --and--.

COLUMN 8

Line 60, "exdriving" should read --exhaust the quantity of flow of gas Q corresponding to a change $\Delta V$ of the volume of the closed space V from the gaps $h_1$ and $h_2$ and the exhaust holes 18 having the conductance $C_0$. Accordingly, by obtaining the value of the conductance $C_2$ of the exhaust holes 18 so that the relationship between the displacement $\Delta x$

UNITED STATES PATENT AND TRADEMARK OFFICE
CERTIFICATE OF CORRECTION

PATENT NO. : 5,317,221
DATED : May 31, 1994
INVENTOR(S) : TADAYUKI KUBO, ET AL.

It is certified that error appears in the above-indentified patent and that said Letters Patent is hereby corrected as shown below:

COLUMN 8

Line 60, (continued)

in the axial direction due to the pressure change $\Delta P$, and the permissible value $x_0$ because $\Delta x < x_0$, and by determining the diameter of the exhaust holes 18, it is possible to suppress vibration in the axial direction and improve accuracy in a positioning operation and to reduce the time for the positioning operation, in the same manner as explained in the embodiment shown in FIG. 1.

Although in the foregoing explanation, the exhaust hole 18 is assumed to have a circular shape, any other shape may be used, provided that the desired conductance $C_2$ is obtained. Although in the above-described embodiments, the shaft is assumed to have a circular cross section for the purpose of providing a small and inexpensive device, the shaft may have a polygonal cross section in order to obtain the effect of the present invention realized by providing the exhaust holes. The linear driving device to which the present invention is applied is not limited to a uniaxial type device, but a device of a biaxial type may also be used. That is, the present invention may be applied to any linear driving device which uses a voice-coil motor as a driving--.

UNITED STATES PATENT AND TRADEMARK OFFICE
CERTIFICATE OF CORRECTION

PATENT NO. : 5,317,221
DATED : May 31, 1994
INVENTOR(S) : TADAYUKI KUBO, ET AL.

Page 3 of 3

It is certified that error appears in the above-indentified patent and that said Letters Patent is hereby corrected as shown below:

COLUMN 8 (continued)

Line 68, "a" should be deleted.

COLUMN 9

Line 19, "haust the quantity of flow of gas Q" should be deleted.
   Lines 20-45 should be deleted.
   Line 46, "device which uses a voice-coil motor as a" should be deleted.

Signed and Sealed this

Fifteenth Day of November, 1994

Attest:

BRUCE LEHMAN

Attesting Officer            Commissioner of Patents and Trademarks